(12) United States Patent  
Cote et al.

(10) Patent No.: US 8,245,973 B2
(45) Date of Patent: Aug. 21, 2012

(54) METHODS AND SYSTEMS FOR IMPROVING AIRCRAFT VISIBILITY

(75) Inventors: Richard A. Cote, Mill Creek, WA (US); Ty A. Larsen, Everett, WA (US)

(73) Assignee: The Boeing Company, Chicago, IL (US)

( * ) Notice: Subject to any disclaimer, the term of this patent is extended or adjusted under 35 U.S.C. 154(b) by 702 days.

(21) Appl. No.: 11/944,246

(22) Filed: Nov. 21, 2007

(65) Prior Publication Data

US 2009/0127386 A1    May 21, 2009

(51) Int. Cl.
  *B64C 1/14* (2006.01)
(52) U.S. Cl. .................... 244/129.1; 244/1 R
(58) Field of Classification Search .......... 244/1 R, 244/119, 129.1, 130, 134 R, 134 A
See application file for complete search history.

(56) References Cited

U.S. PATENT DOCUMENTS

| | | | | |
|---|---|---|---|---|
| 1,771,086 A * | 7/1930 | Hyatt | ............................. | 362/472 |
| 2,531,541 A * | 11/1950 | Spicer | ........................ | 244/134 E |
| 2,636,697 A * | 4/1953 | Denny | ........................... | 244/1 R |
| 3,031,645 A * | 4/1962 | Koontz | .......................... | 340/982 |
| 3,065,940 A * | 11/1962 | Eckstein | ....................... | 244/130 |
| 3,712,566 A * | 1/1973 | Branen et al. | ............. | 244/117 A |
| 3,986,690 A * | 10/1976 | Milling | .......................... | 244/121 |
| 3,989,775 A | 11/1976 | Jack et al. | | |
| 4,256,366 A * | 3/1981 | Buckelew | ..................... | 359/548 |
| 4,272,564 A | 6/1981 | Grewe et al. | | |
| 4,299,442 A * | 11/1981 | Buckelew | ..................... | 359/548 |
| 4,644,895 A * | 2/1987 | Cozad | ........................... | 116/200 |
| 4,712,867 A | 12/1987 | Malek | | |
| 4,768,738 A * | 9/1988 | Weinert | ...................... | 244/53 R |
| 4,957,335 A | 9/1990 | Kuney et al. | | |
| 5,670,209 A | 9/1997 | Wyckoff | | |
| 5,719,568 A | 2/1998 | Adams | | |
| 5,750,191 A | 5/1998 | Hachey et al. | | |
| 6,153,128 A | 11/2000 | Lightle et al. | | |
| 6,244,728 B1 | 6/2001 | Cote et al. | | |
| 6,669,357 B2 | 12/2003 | Konicke et al. | | |
| 6,960,750 B2 * | 11/2005 | Doane | ........................ | 250/206.1 |

* cited by examiner

*Primary Examiner* — Timothy D Collins
*Assistant Examiner* — Brian M O'Hara
(74) *Attorney, Agent, or Firm* — Armstrong Teasdale LLP

(57) ABSTRACT

A method for improving the conspicuity of aircraft is described that includes determining onto which exposed portions of an aircraft surface a retro-reflective material is to be placed, and attaching the retro-reflective material to the exposed portions such that an observer of the retro-reflective material is provided with an indication of a size, location, and orientation of the aircraft.

14 Claims, 4 Drawing Sheets

METHODS AND SYSTEMS FOR IMPROVING AIRCRAFT VISIBILITY

BACKGROUND OF THE INVENTION

This invention relates generally to visibility of aircraft, and more particularly, to methods and systems for improving aircraft visibility by addressing aircraft visibility issues associated with aircraft on the ground.

Current collision avoidance techniques are designed for use primarily while an airplane is in flight, with ground and air traffic control being responsible for safely authorizing ground transit, landing and departure of airplanes. One practice that pilots and air traffic control employ to ensure proper separation distances and safe aircraft operation is the principal of "See and Avoid". The aircraft's paint scheme and exterior lighting systems play a large role in this practice. To enhance their conspicuity, pilots are advised to turn on all exterior lights when operating below a prescribed altitude. Certain aircraft exterior lights, such as the position and anticollision lights, are turned on at all times during operation day or night, unless they are bothersome to the pilot. These lights increase the conspicuity of an aircraft and provide a visual indication of an aircraft's position and direction of travel to other pilots.

While an aircraft is on the ground, anticollision and position lights can be difficult to distinguish and can blend in with other lights such as runway lights and approach lights. Aircraft are also equipped with lighting systems such as landing, taxi, and runway turnoff lights which serve to illuminate the ground during ground operations, takeoff/departure, and approach/landing. These lights can also increase an aircraft's conspicuity in certain situations. The landing lights however, are very intense and are generally used only during the approach/landing and takeoff/departure phases of flight. While an aircraft is maneuvered on the ground the landing lights are generally not used because they can temporarily blind other pilots and ground personnel. In other words, these lights are bothersome to those operating aircraft and other ground vehicles in the vicinity of an aircraft using such lights, and their use may actually create unsafe situations in certain situations. The intensity of these lights in a ground operations environment is hazardous in one regard, as the beam is certainly blinding to operators of equipment in the vicinity.

An aircraft's paint scheme can also effect its conspicuity. In order for an object to be visible, there must be some contrast with its surroundings. Dark colors when viewed against a dark background, or colors which blend in with surroundings can make an aircraft difficult to see in certain situations.

There are instances when an aircraft is difficult to discern in a dark environment. Existing aircraft exterior lights such as position lights and anticollision lights can often blend in with surroundings when many light sources, such as runway or approach lights, are present in the background. Also, it is often difficult to judge the distance to a single light source if the source itself is very small. Conversely, sources of light which are large can often enable a pilot to judge the distance and orientation. For example, logo lights that illuminate the vertical stabilizer of an aircraft, can improve a pilot's ability to more effectively judge the orientation and distance to the illuminated aircraft from certain directions. Sources of illumination such as landing, taxi, runway turnoff and logo lights can also help improve the conspicuity of an aircraft in some instances by illuminating large areas on the ground.

In spite of emphasizing the use of exterior lights to enhance the "See and Avoid" or "See and be Seen" principal, near misses or potential for ground incursions continue to be a major safety problem. There have been many instances according to aviation regulatory officials. These incidents include recent close calls and accidents that have highlighted a need for improved safety features on airplanes to supplement other methods when aircraft are maneuvering on runways and taxiways. These types of accidents have proven to be particularly devastating and are far more likely to happen than mid air collisions.

In one currently implemented configuration, a lighting system is employed that illuminates the ground underneath an aircraft, thereby creating an illuminated silhouette of the airplane visible to other aircraft that might be approaching from above it. While effective in this situation, such a system requires the addition of lights, light housings, and wiring. Such additions add weight to the aircraft while also increasing the electrical power consumption of the aircraft.

In another implemented configuration, large self illuminated or luminescent area sources called formation lights are installed on fighter aircraft and helicopters to help pilots judge their position relative to other aircraft flying in close formation. By observing the size and shape of the formation lights, military pilots can rapidly and efficiently determine the speed, orientation and distance of other aircraft with just a glance in low lighting conditions. Formation lights produce light which is more uniform and less irritating to a dark adapted pilot, compared with position lights or anticollision lights.

In some instances, anticollision lights and position lights are turned off when aircraft are flying in formation in order to prevent such irritation. Since the aircraft could have the short wingspan of a fighter jet or the large wingspan of a cargo airplane, it is very disorienting trying to determine distance and orientation using only traditional aircraft exterior lights. Formation lights are much more effective because they are area sources of light rather than point sources, allowing pilots to judge the orientation and distance of other aircraft by viewing the projected size and shape of the formation light panel. However, addition of formation lights increase the weight of an aircraft and increase the amount of electrical an aircraft must generate.

Other existing aircraft lighting and traffic avoidance systems are not specifically designed to protect against such a situation. Existing traffic avoidance lighting systems are specifically made to warn away other aircraft at greater distances and when in flight. The large variation of aircraft sizes and light installations therefore makes these systems less effective when the aircraft is on the ground and being viewed in poor lighting conditions. Additionally the position lights and anticollision lights tend to blend in with surroundings when viewed against a background that contains many other light sources This is especially common on the ground where runway lights and approach lights can make it difficult to distinguish the lights mounted on an aircraft. Air traffic and ground control are effective in most instances at maintaining safe aircraft separation, but due to human error accidents still happen. Recently the incidence of near misses at airports has been studied and has been reported to be alarmingly high. Reconstruction of recorded position data for the aircraft involved in one of these near misses has indicated that a catastrophic crash was avoided with less than 50 feet of separation.

BRIEF DESCRIPTION OF THE INVENTION

In one aspect, a method for improving the conspicuity of aircraft is provided that includes determining onto which exposed portions of an aircraft surface a retro-reflective material is to be placed, and attaching the retro-reflective material to the exposed portions such that an observer of the retro-reflective material is provided with an indication of a size, location, and orientation of the aircraft.

In another aspect, an aircraft is provided that includes a fuselage, a plurality of wings comprising one or more control surfaces, and a retro-reflective material incorporated onto at least one of the fuselage and the wings, such that a reflection from the retro-reflective material will provide an observer external to the aircraft an indication of size, location, and orientation of the aircraft.

DETAILED DESCRIPTION OF THE INVENTION

Figure 1:
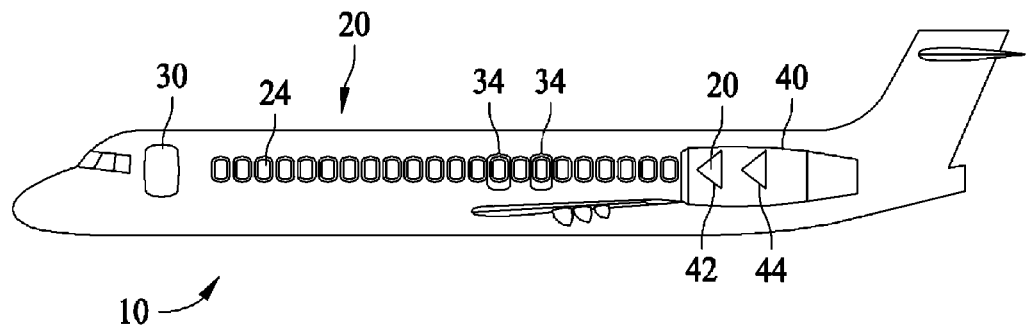
FIG. 1 is a side view of an aircraft incorporating retro-reflective safety marking materials.

The described embodiments relate to incorporation of materials into aircraft exterior coatings that provide retro-reflective capabilities. These retro-reflective materials increase the amount of return light seen by those external to the aircraft, for example, incoming aircraft and taxiing aircraft. The retro-reflective materials will return light with high contrast to surroundings compared with typical paint finishes, thus increasing an aircraft's conspicuity. The distance and relative orientation of an aircraft equipped with retro-reflective materials is easier to discern by an approaching pilot in dark conditions compared to a similar aircraft that is not equipped with the retro reflective materials. As will be further described herein, the retro-reflective materials are incorporated into aircraft in a number of alternative embodiments in such a manner as to maximize a lifetime of such materials. The retro-reflective materials may be arranged in highly conspicuous patterns so that those external to the aircraft will recognize the reflections as being from an aircraft, thereby improving safety.

The described embodiments include retro-reflective treatments that are adapted to survive in the aerospace environment, while also providing considerably more visual information to pilots. Such treatments are believed to be advantageous, as they are always "on." That is, the treatments function by reflecting any received light directly back to the originating light source and do not require electrical power. These treatments also provide an area source of light with high contrast to surroundings which make distance and orientation of an aircraft more readily apparent to other pilots. In one of the aerospace applications contemplated, a pilot of an aircraft on approach with its landing lights shining down to illuminate a runway is thought to be much more likely to see other aircraft on the ground that incorporate the retro-reflective materials described herein. Particularly, the retro-reflective materials will reflect the light from the landing lights back towards the aircraft on approach, as it is the source of the light beam. As further described herein, the configurations of the retro-reflective materials, in addition to making an aircraft more conspicuous, provide useful information to other pilots, such as a size of the airplane on the ground, an orientation of the airplane on the ground, and an orientation of the aircraft on the ground (to help a pilot to quickly identify that the object is an airplane in its path and determine a rough direction for the airplane, allowing for faster corrective actions.) The described embodiments provide a "passive" system, particularly, a system that operates without pilot or ground control intervention. Such a system is believed to add an additional safety layer that will help reduce accidents without requiring the installation of lighting that requires electrical power and wiring, as well as adding weight and system complexity to the airplane.

Now referring to the Figures, FIG. 1 is a side view of an aircraft 10 incorporating retro-reflective safety marking materials 20. In the illustrated embodiment, the materials 20 are incorporated such that they outline the passenger windows 24, door 30 and emergency exits 34 of the aircraft 10. Additionally, the materials 20 are incorporated into the surface coating for an engine cowling 40, which is sometimes referred to as a nacelle. In particular, the materials 20 are incorporated on the engine cowling 40 to form arrows 42 and 44 that point towards a front 46 of aircraft 10.

Incorporating retro-reflective materials 20 near doors 30, windows 24, and engine cowlings 40 maximizes a surface area covered with the materials 20 while also minimizing cost and complexity of maintenance checks and installation. The engine cowlings 40 are one prime location for side visible markings, as very few airlines extend their logos to these areas. Such a marking pattern provides side angle conspicuity while enabling other pilots to more accurately judge the airplane length, distance, and direction of travel.

Incorporation of materials 20 into each of the window areas 24, represents breaks in the aircraft structure, typically requiring periodic maintenance. However, the window areas 24 also run the length of most aircraft, thereby resulting in good candidate locations for locating the materials 20, by providing a good indication of aircraft length, distance and relative orientation.

The materials 20 when incorporated as shown in the illustrated embodiment, result in a pattern that increases conspicuity, and provides visual indication of aircraft size, distance, orientation and direction of travel. Of course other patterns of material 20 can be incorporated as long as a visual indication of aircraft size, distance, orientation and direction of travel results.

Figure 2:
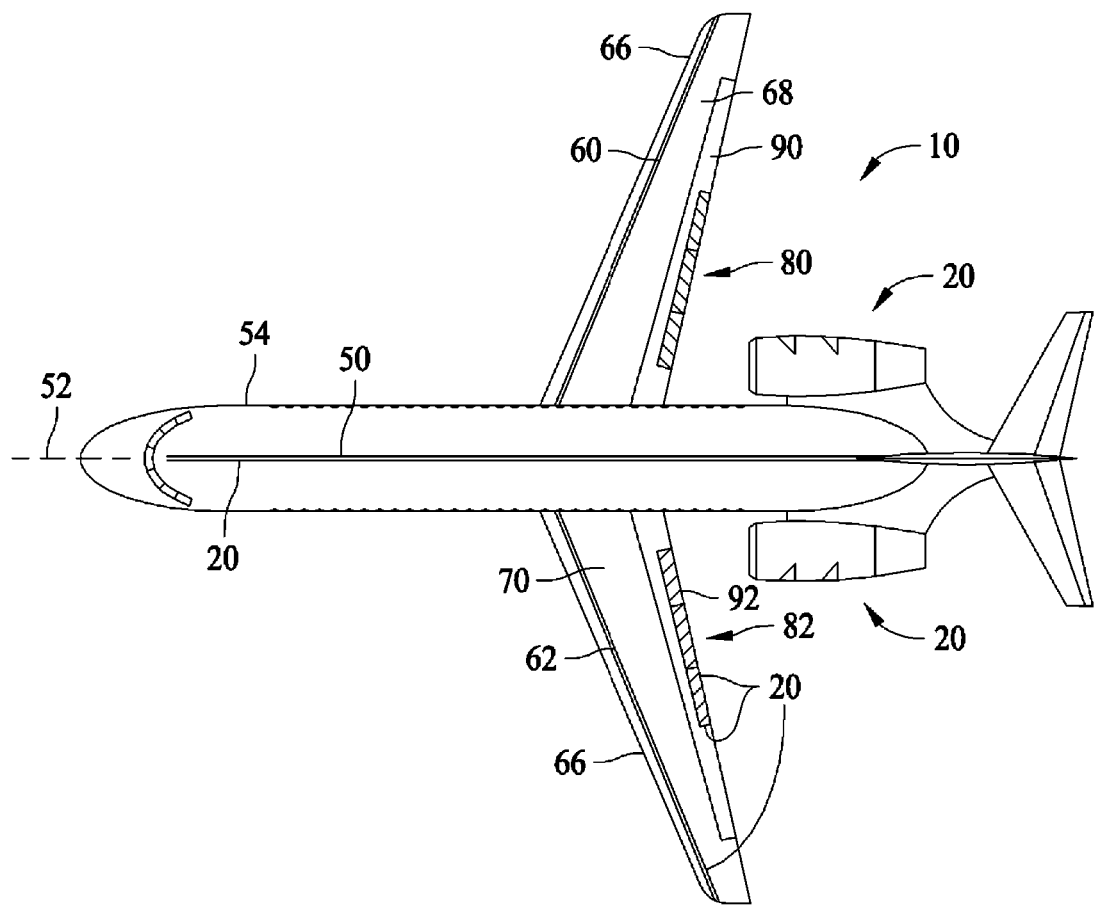
FIG. 2 is a top view of the aircraft of FIG. 1 illustrating additional incorporation of retro-reflective safety marking materials.

FIG. 2 is a top view of the aircraft 10 illustrating additional incorporation of retro-reflective safety marking materials 20. More specifically, a strip 50 of material 20 is incorporated along a top centerline 52 of a fuselage 54. Additional strips 60 and 62 are incorporated along a leading edge 66 of wings 68 and 70. Additional patterns 80 and 82 of material 20 are incorporated in the area of wings 68 and 70 near rear flaps 90 and 92 respectively.

The materials 20 consist of linear markings aligned with the centerline 52 of the airplane 10, thereby minimizing the frontal surface area of the treatment exposed to the air stream, which also limits the aircraft drag associated with the materials 20 and damage to the retro-reflective materials 20. The retro-reflective safety marking materials 20 illustrated in FIG. 2 are arranged to take advantage of breaks in flush surfaces (near control surfaces and other) to reduce wear due to the air stream encountered during flight. Such arrangements also incorporate other necessary markings into the material patterns (one example is the NO STEP indication on certain areas of an airplane wing) which reduces a need for any additional markings on aircraft. Note that the engine nacelle pattern described with respect to FIG. 1 is also visible in the embodiment of FIG. 2.

Figure 3:
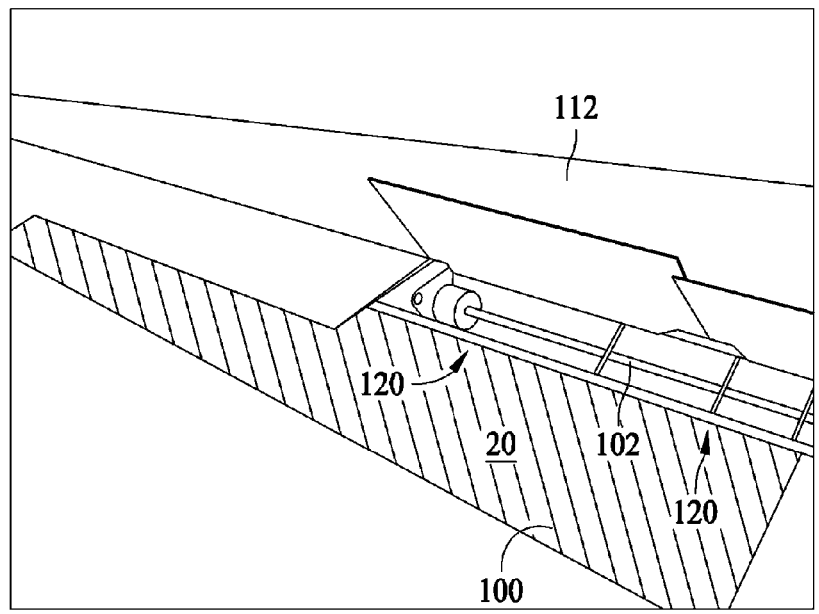
FIG. 3 is an illustration of retro-reflective safety marking materials incorporated onto a wing flap of an aircraft.

FIG. 3 is an illustration of retro-reflective safety marking materials 20 incorporated onto a wing flap 100 and is one example of an application technique for the reflective materials 20 that increase a lifetime of the patterns in an aerospace environment. In the embodiment, a leading edge 102 of the material 20 is protected during much of an aircraft flight due to it being under flaps 110 and 112. Additionally, when an airplane is on the ground with flaps 100, 110 and 112 positioned for takeoff, large areas of the retro-reflective material 20, for example, on flap 100 are exposed, thereby increasing the likelihood of the aircraft being seen by other aircraft.

These high lift locations are particularly advantageous for multiple reasons. First, in normal cruise configurations the high lift components (flaps 110 and 112) are substantially flush against flap 100. This provides inherent protection for the materials 20, and ensures they are only fully exposed to the aircraft environment during takeoff and landing maneuvers. Second, these wing sections are separate components that can be modified without requiring significant modification to the aircraft as a whole. Third, while on the ground with flaps extended, large amounts of surface area are exposed at near perpendicular angles to any traffic coming from the rear, ensuring maximum light return. Finally, these airplane locations have a large surface in which a significant amount of material 20 can be incorporated.

FIG. 3 provides one detailed example of where retro-reflective materials 20 are added to provide increased conspicuity of the aircraft 10. As illustrated in FIG. 3, the largest sections of materials 20 are placed on high lift surfaces such as flap 100. As the flaps 100, 110, and 112 retract for cruise, the forward leading portions 120 of the coatings and laminates (e.g., the materials 20), which is the most easily damaged portions of the materials 20 as described herein, are "pinched" by the spoiler systems or other equivalent surfaces (e.g., flaps 110 and 112) thereby providing protection in cruise. The protected portions 120 upon landing, takeoff, during preparation for takeoff, or other ground operations, are deployed and visible as the flaps 100, 110, and 112 extend. FIG. 3 further includes a stripe 130 of materials 20 located near the forward leading edge 132 of the wing. Stripe 130 is protected in a similar fashion as it is located near control surfaces of the wing. Similar to the back of the wing, the coatings and laminates associated with materials 20 are extended as far as possible under the travel path of the control surfaces associated with the front of the wing in order to gain protection for the surfaces of material 20 while in flight.

Application of most current known retro-reflective tapes and paints would result in a limited lifespan due to the extreme environments it is subjected to during airplane utilization (e.g., jet stream, severe weather, etc.). To increase the lifespan of the retro-reflective material, one embodiment includes a decorative, yet retro-reflective safety coating that allows aircraft surface paint to operate as an integral safety marking. Such paint includes an integration of retro-reflective features for aircraft into exterior coatings and laminates. In alternative embodiments, the retro-reflective materials are integrated into a skin, structure, and other components of the airplane, minimizing weight and complexity. Another embodiment of survivable laminate and coatings include laminates and coatings impregnated with glass beads, the glass beads being the retro-reflective material. Another embodiment of survivable laminates and coatings include laminates and coatings impregnated with small corner reflector elements, where the corner reflectors are the retro-reflective material.

In any of the described embodiments, the retro-reflective materials are always operative as they simply reflect light back at the originating light source, for example, other airplanes that have illuminated the retro-reflective material with landing lights. At least one benefit of such a system is that it is inherently safe in that no operator initiated control can accidentally be left off and its operation is not dependant on a power supply or light source that can fail.

The embodiments described herein utilize retro-reflective paints, tapes and/or laminates, referred to collectively herein as materials 20, that are applied in specific patterns along the aircraft fuselage and wings. These retro-reflective materials 20 are configured specifically to reflect light back in the direction from which it came, thereby making the materials 20 highly visible with excellent contrast to surroundings.

While the after market addition of tape/laminate patterns on existing aircraft is certainly contemplated in the herein described embodiments, aerodynamic drag and life span issues are likely to be a concern.

Figure 4:
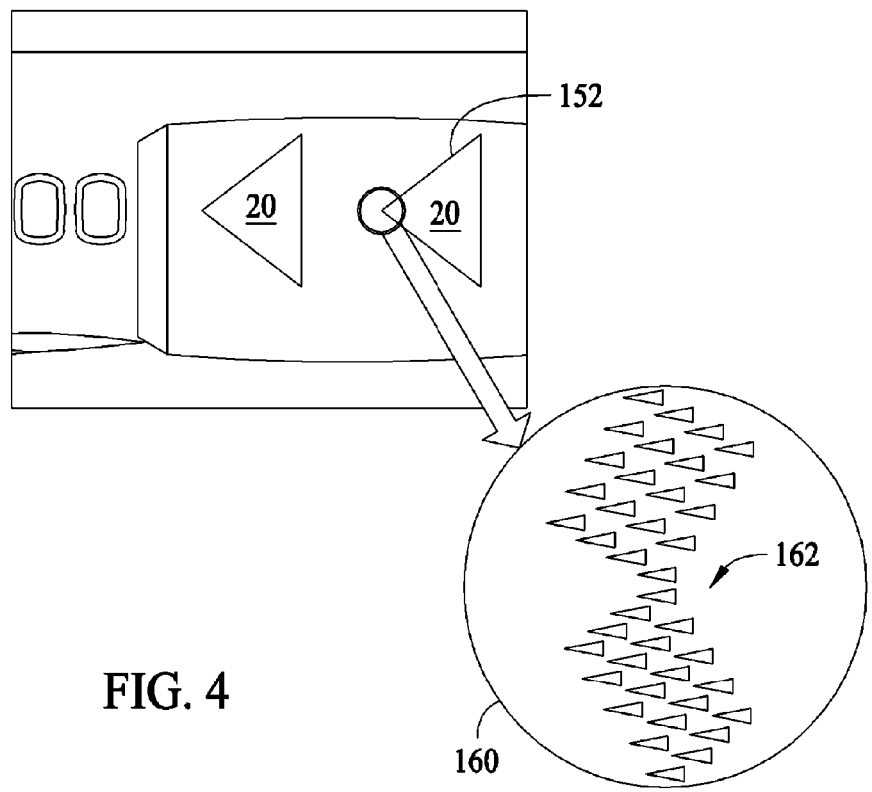
FIG. 4 is an illustration of an alternative configuration for retro-reflective safety marking materials on an aircraft engine.

It is also possible to shape the laminates and coatings utilized as material 20 to resist delaminating or peeling in flight, as further illustrated in FIG. 4. For example, it is believed that the chevron markings 150 and 152 shown on the engine cowling 40 not only provide direction indication, but also reduce the angle of the air stream that impinges it, while also providing mutual protection from direct air stream damage for remaining elements of the patterns processing down the length of the fuselage. The use of broken and separate elements in a pattern also is believed to reduce failure of the overall pattern as compared to single sheet designs, as failure of individual pattern elements results only in the loss of individual segments or facets, rather than having the entire laminate sheet completely failing as the entire design is pealed off by the increasing amount of exposed material.

Design of such pre-cut or "shredded" designs are implemented either by physical separation as shown, or by pressing or perforating continuous sheets of retro-reflective materials to create break away points. Such construction may increase survivability of laminates directly applied to the exterior of aircraft, allowing installation with no further modifications to the airplane being needed, although additional research is needed. As illustrated by the inset 160 of FIG. 4, larger patterns can be created by using large numbers of smaller chevron shaped sections 162. The patterns are easily created as known techniques are utilized for performing single sheet installations that incorporate large numbers of smaller sections such as the smaller shaped chevron sections 162. Patterns such as the one illustrated in inset 160 are adaptable to create a more survivable, lighter weight, low drag marking system for aircraft that from a distance would have the appearance of a much large marking pattern.

FIGS. 5A through 5D illustrate further options for incorporating materials 20 onto a surface of an aircraft to provide greater visibility of aircraft to those external to the aircraft. The described channel/groove installation provides a desirable result in that the retro-reflective materials 20 have an increased lifespan, aerodynamic drag is minimized, and patterns can be optimized to attract the attention of oncoming pilots.

Figure 5A:
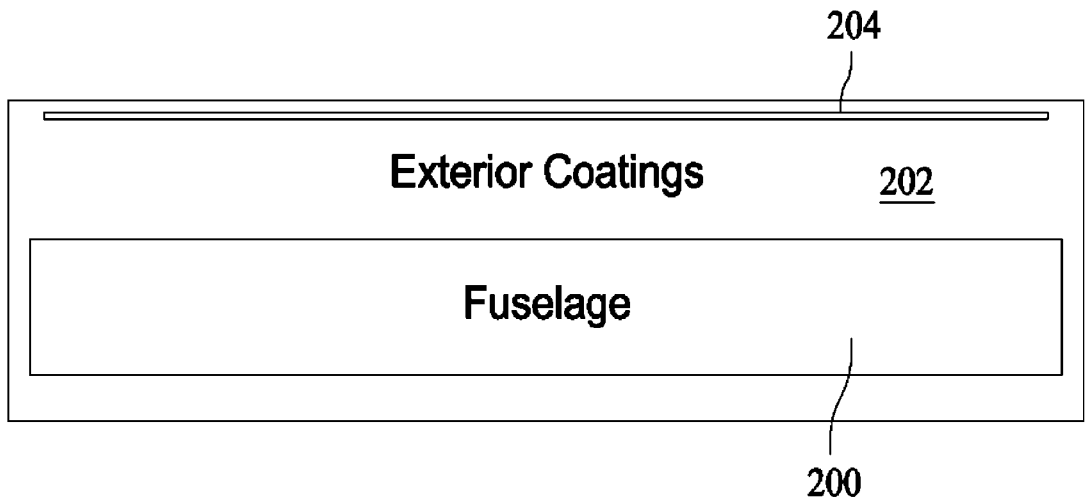
FIGS. 5A-5D illustrate incorporation of retro-reflective safety marking materials into the exterior coating for an aircraft surface.

More specifically, FIG. 5A illustrates a typical aircraft surface coating configuration, namely, the fuselage 200 is coated with one or more exterior coatings 202 that eventually provide an external surface 204.

Figure 5B:
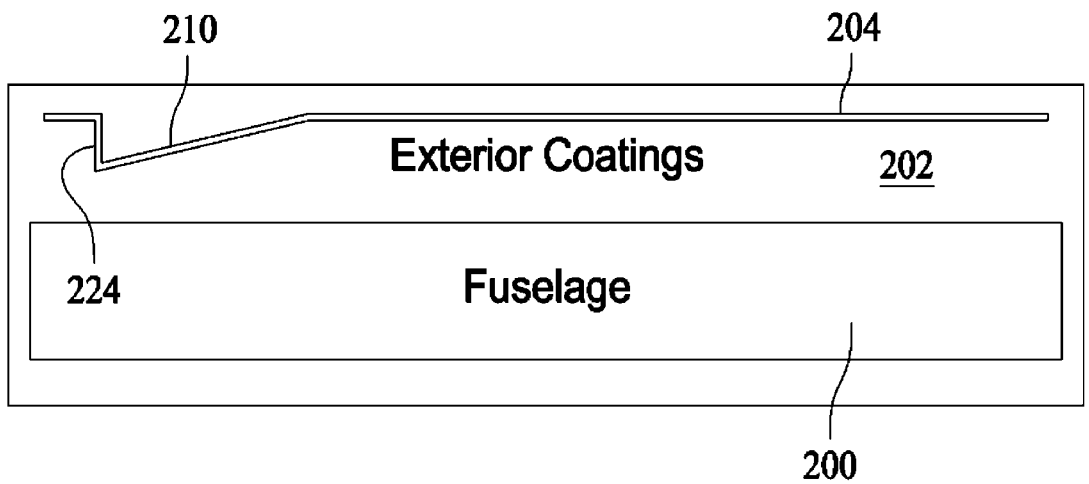

Now referring to FIG. 5B, in one embodiment, a channel 210, or groove is formed in the exterior coatings 202 for the purpose of utilizing the above described materials 20 as an element of the airplane's skin. Now referring to FIG. 5C, the channels 210 and grooves are etched or otherwise formed in the airplane skin (in the exterior coatings 202) in such a manner as the materials 20 (e.g., tapes, paints, and/or laminates) form a flush surface 220 with the external surface 204 of the airplane, thereby improving aerodynamic performance while also assisting in maintainability of the patterns by providing a physical outline to fill.

Figure 5C:
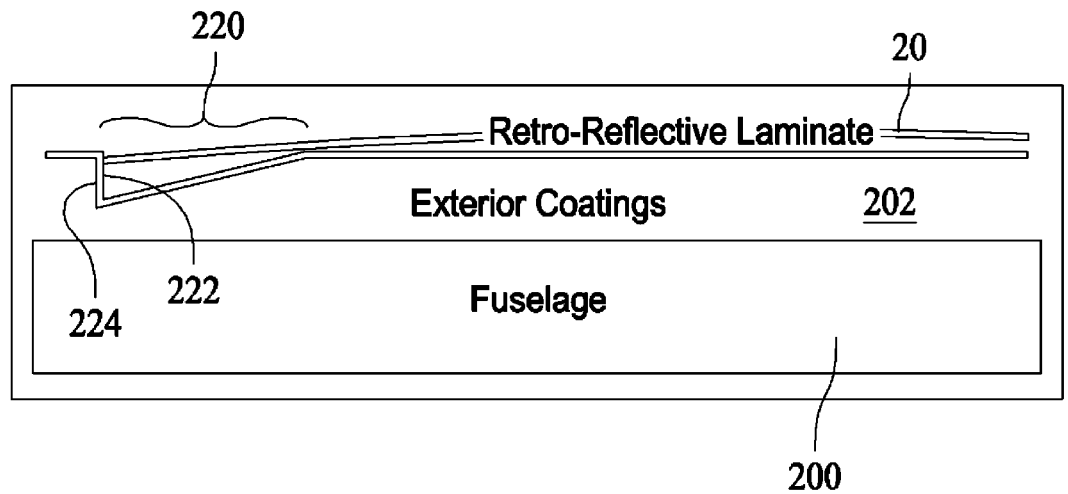
Figure 5D:
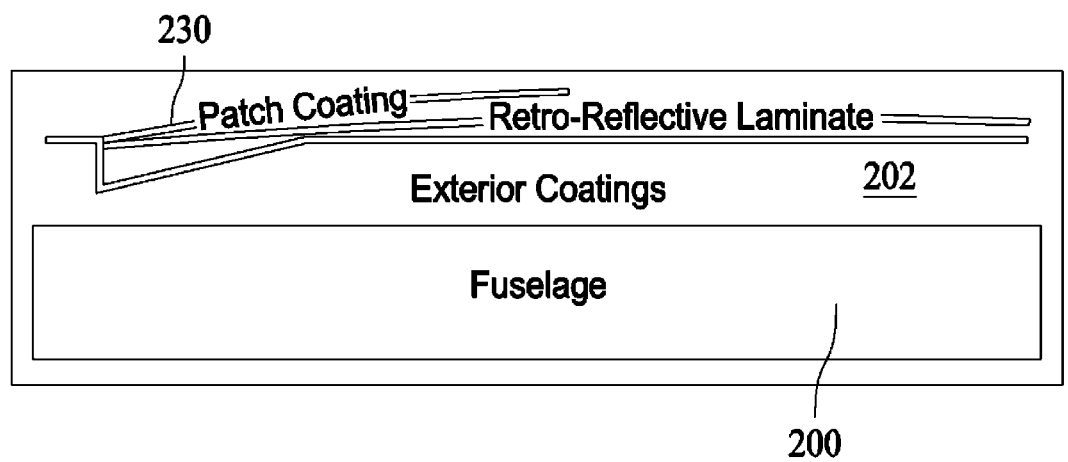

It is expected that the forward leading edge 222 of the materials 20 will experience the worst wear in the airstream. The approach illustrated in FIGS. 5A through 5D minimize the leading edge 222 this area through one or more of shaping the leading edge of the material 20 and the modification of the already existing coatings 202 (e.g., cutting the channels 210). As illustrated and above described, a patch of the exterior coating 202 is sanded or scraped out to provide a lip portion 224 of the channel 210. As illustrated in FIG. 5C, the materials 20 are positioned such that the leading edge 222 is laid where the exterior coating 202 has been removed. In FIG. 5D a patch 230 of exterior coating materials may be extended over the leading edge patch 222 of the materials 20, similar to an exterior coating patch repair.

In another embodiment, referred to as a blended paint treatment, patterns of retro-reflective paints are incorporated into an existing aircraft paint scheme, thereby also creating a smooth and aerodynamically flush finish. In other embodiments, other required aircraft markings are incorporated to utilize the materials 20. As a non-limiting example, the collision avoidance patterns fabricated from the materials 20 are fabricated to include local "NO STEP," "MOVING PART," "HIGH HEAT," and "EM DANGER" hazard signage into the material, thereby performing two functions for the airplane.

Additionally, through modification of existing coatings it is possible to provide retro-reflective functionality in an existing paint or laminate. For example, pearlescent colors used on aircraft flown by one or more carriers is modified to include the above described glass beads and the like to provide enhanced night time visibility while still maintaining the attractive look of the more traditional metallic type coatings.

In summary, the retro-reflective material 20 is placed, for example, in specific patterns across upper surfaces of an airplane. Patterns are made specifically to provide high contrast compared to other airplane markings and airport markings. Having large runs of the retro reflective material (for example, along substantially the entire length of the wing and from the front of the aircraft to the rear of the aircraft along the upper surface of the fuselage) provides a large amount of return light with high contrast to surroundings to an oncoming pilot, thereby making the airplane more easily visible and giving oncoming aircraft more time to notice its presence and divert. The long runs of retro reflective material will also assist pilots in more accurately judging the size, distance and orientation of the aircraft they are approaching.

Currently if an airplane is approaching another airplane from behind that is on the ground, the only possibly visible light is the light that originates from the upper anti-collision light and (depending on airplane type and other factors) maybe some light from the aft position lights mounted in the wingtips and tail. Due to the spacing of these lights and the fact that they are designed to show position to other aircraft at much greater distances at similar flight altitudes however, it is difficult in low light conditions to determine that these lights are mounted on an aircraft, because they can blend with or be obscured by surrounding or background lights. In some cases, the lights may be mistakenly assumed to be part of the runway lighting systems. The strobe light source of a single fuselage anti-collision light on the ground may attract a pilots attention, but it will not trigger an immediate response in most cases as the magnitude of the danger is not immediately known. In addition, the strobe source of the aircraft light will likely not be as intense as the strobe light sources of the approach lights or runway end identifier strobe lights. If however a pilot can distinguish the rough outline of an airplane's wings and fuselage, then the threat is suddenly readily apparent and the pilot will immediately focus on trying to avoid collision rather than wasting moments on trying to determine if there even is a threat or not. In such cases the size and spacing of the markings become far more important than the brightness of any one light mounted on the airplane.

Retro-reflective patterns on the top surfaces of the airplane will provide much more visual information to an approaching airplane than just existing point-sources of lights. The rough outline of the wings and the length of the fuselage would be visible as an approaching aircrafts landing lights strike it, thereby making it apparent that another aircraft is on the ground. The airplanes relative size, distance, orientation and direction of travel would also be more easily discernible, allowing pilots to adjust their emergency response accordingly. This also provides a beneficial psychological response, as pilots will be far more likely to react quickly to a large reflective shape than a point source of light on the tarmac.

The image shape of a runway appears trapezoidal to the pilot of an aircraft while it is on glide path, and the form ratio of this shape provides a visual clue of the glide path angle to the pilot. In some embodiments, the materials 20 from which the patterns are formed are fabricated such that, from a typical glide path angle of approximately three degrees from horizontal, for example, the reflected light appears to form a shape that would not commonly be seen on the runway, for example, a perfect square or a rectangle. Due to the receding viewing angles associated with observing the runway at a shallow angle relative to horizontal, most flat, rectangular shapes and markings will appear to form a trapezoid to a pilot on approach. By creating a reverse angle pattern across the top fuselage of an aircraft and/or the wings, it appears to an approaching pilot that large illuminated square or rectangular objects are present on their intended runway touchdown point. Even if other runway retro-reflective markings are present, the odd shape will immediately be obvious. The end goal is to signify that there is something on the runway that requires immediate attention, and is unusual compared to any other marking or object on or near the runway which a pilot may have previously encountered. This should give pilots more time to react and provide an additional level of safety to prevent an accidental near miss, incursion or collision.

As described above, existing solutions to the problems described herein rely on one or more of ground control and powered lighting systems. One problem associated with ground control based solutions is that ground control issues and human error have still led to accidents due to runway incursions. One problem with the various powered exterior aircraft lighting systems as installed and mandated by regulative authorities is that they are only partially effective at warning away an aircraft that is heading directly toward another aircraft at a very shallow angle. Such is the case when an aircraft is on glide path for landing and another aircraft is on the runway. In addition, in some instances the light emanating from an installed exterior light mounted on the aircraft located on the runway may be blocked by the vertical stabilizer of the aircraft in the direction of approaching traffic on glide path.

Existing aircraft exterior lights are point sources of light rather than area sources of light, making determination of an aircraft's length, position, orientation and distance by observing the aircraft light at night, difficult. On the ground, existing aircraft external lights can be obscured, masked, or overpowered by other lights in the background or surroundings such as runway lights and approach lights. Additional aircraft external lighting systems would add weight, cost and complexity, and could require that the crew turn them on at the appropriate times or that a means of automatic control be provided that could fail.

While the invention has been described in terms of various specific embodiments, those skilled in the art will recognize that the invention can be practiced with modification within the spirit and scope of the claims.

What is claimed is:

1. A method for improving the conspicuity of aircraft comprising:
    determining onto which exposed portions of an aircraft surface a retro-reflective material is to be placed;
    attaching the retro-reflective material to the exposed portions in conspicuous patterns such that the conspicuous patterns of retro-reflective material provide an observer with an indication of a size, location, and orientation of the aircraft, wherein the size of the aircraft includes at least the length of the aircraft;
    configuring the aircraft such that at least a leading edge of the retro-reflective material is at least partially protected from an aircraft operation environment; and
    applying a patch material over the leading edge of the retro-reflective material.

2. A method according to claim 1 wherein configuring the aircraft comprises:
    configuring an exterior coating of the aircraft such that a lip is formed in the exterior coating at the leading edge of the determined portion; and
    installing the leading edge of the retro-reflective material into the leading edge lip.

3. A method according to claim 1 wherein configuring the aircraft comprises applying the retro-reflective material such that the leading edge of the retro-reflective material is protected by a control surface of the aircraft during flight.

4. A method according to claim 3 wherein applying the retro-reflective material comprises applying the retro-reflective material on aircraft surfaces that are under control surfaces during flight and exposed when the control surfaces are in a position utilized during aircraft take off and landing maneuvers.

5. A method according to claim 4, wherein applying the retro-reflective material on aircraft surfaces comprises applying the retro-reflective material on a wing flap of the aircraft.

6. A method according to claim 1 wherein attaching the retro-reflective material to the exposed portions comprises installing the retro-reflective material in conspicuous patterns that include a plurality of chevron shaped sections.

7. A method according to claim 1 wherein attaching the retro-reflective material comprises at least one of attaching an adhesive tape coated with retro-reflective materials, applying a coating that includes the retro-reflective materials, and applying a laminated material that includes the retro-reflective materials.

8. A method according to claim 1 wherein attaching the retro-reflective material to the exposed portions comprises installing the retro-reflective material so as to maintain an aerodynamic surface for the aircraft.

9. A method according to claim 1 further comprising attaching the retro-reflective material at one or more of:
    around a perimeter of passenger windows of the aircraft;
    around a perimeter of doors of the aircraft;
    around a perimeter of emergency exit doors of the aircraft;
    on an engine cowling of the aircraft; and
    along a top centerline of a fuselage of the aircraft.

10. A method according to claim 1 wherein attaching the retro-reflective material to the exposed portions further comprises incorporating the retro-reflective material into a paint scheme of an airline that operates the aircraft.

11. A method according to claim 1, wherein attaching the retro-reflective material to the exposed portions comprises attaching the retro-reflective material around a perimeter of passenger windows of the aircraft.

12. A method according to claim 1, wherein attaching the retro-reflective material to the exposed portions comprises attaching the retro-reflective material around a perimeter of doors of the aircraft.

13. A method according to claim 1, wherein attaching the retro-reflective material to the exposed portions comprises attaching the retro-reflective material on an engine cowling of the aircraft such that the conspicuous patterns of retro-reflective material provide side angle conspicuity.

14. A method according to claim 13, wherein the conspicuous patterns on the engine cowling include arrows that point towards a front of the aircraft.

* * * * *